United States Patent [19]

Scott

[11] 4,389,461

[45] Jun. 21, 1983

[54] PIPELINE PIG

[75] Inventor: Paul R. Scott, Brazoria, Tex.

[73] Assignee: Shell Oil Company, Houston, Tex.

[21] Appl. No.: 356,011

[22] Filed: Mar. 8, 1982

[51] Int. Cl.³ .......................... B32B 1/06; B05D 7/22

[52] U.S. Cl. .................................. 428/543; 427/181; 427/230; 427/238; 427/296

[58] Field of Search ............... 427/181, 230, 238, 296; 428/543

[56] References Cited

U.S. PATENT DOCUMENTS 4,216,026 8/1980 Scott .......................................... 134/4
4,252,465 2/1981 Broussard et al. .................. 405/158

*Primary Examiner*—James R. Hoffman

[57] ABSTRACT

A polymeric foam pipeline pig, having its cells filled with a gel, is resistant to compression when subjected to pipeline pressure.

10 Claims, 5 Drawing Figures

PIPELINE PIG

BACKGROUND OF THE INVENTION

Pigs frequently are used in cleaning pipelines or separating product batches in a pipeline. In pipelines having internal obstructions, or a substantially varying diameter, there is significant risk in using a pig which may become stuck. And, such risk is enormous in deep water pipelines where the cost and lost time in recovering the stuck pig and re-opening the pipeline are substantial. For such pipelines, it is attractive to use a foam pig which is capable of changing size to get around obstructions or adapt to a different pipe diameter. However, foam pigs are not without problems also, and have been known to occasionally fail in the past. Foam pigs fail because (1) air or gas trapped in the foam compresses when the pig is subjected to pressure, decreasing its effective size and allowing a displacement fluid to bypass; (2) an open cell construction allows the displacement fluid to flow through the pig; and (3) a plastic coating on the pig to prevent bypass fails because the coating does not form a seal at the pipe wall.

Accordingly, the present invention is directed to overcoming the above-identified problems of the art by providing a novel pipeline pig which not only solves the above problems but also has other advantages as will become apparent hereinafter.

SUMMARY OF THE INVENTION

The principal purpose of the present invention is to provide a polymeric foam pipeline pig which has been modified to avoid failure in pipeline usage resulting in liquid bypass. Thus, the foam pig of this invention is resistant to compression when it is subjected to pressure in a pipeline by a displacement fluid; the modification prevents or reduces displacement fluid passage through the pig, and it forms an effective seal with the pipe wall.

This and other purposes of the present invention are realized by modifying a foam pig as follows. The pig is either formed with holes or has holes formed thereafter throughout its diameter to expedite the removal of air from the foam cells and filling with liquid. While liquid filling may be achieved without such holes, the process is more difficult. Reagents, polymers such as biopolymers and/or organo modified smectite are dispersed throughout the open cell foam to cause the liquid filling the pores of the pig to form a plastic gel. Preferably, the gel exhibits both a high viscosity and high yield strength. These properties tend to prevent the gel from being displaced from the foam pig as a displacement fluid moves the pig through the pipeline. Also, the gel improves the seal formed between the pig and pipe wall.

Other modifications also aid in realizing the purposes of the invention. Thus, the pig, preferably while in a pipeline pig launcher, is subjected to a vacuum either before fluid is added or while the launcher is being filled with the displacement fluid, if the displacement fluid is water. If the displacement fluid is a gas, the launcher should be filled with either water or diesel oil. The vacuum tends to rupture closed cells within the foam which are full of the blowing gas and/or other gases. When the vacuum is released, these cells tend to fill with liquid. Thereafter, the liquid filled pig is kept static for a period of time, e.g., several hours, to allow the gel to form in situ. The pig then is launched with the displacement fluid. The launch is accomplished with a minimum of bypassing of the displacement fluid, e.g., by mechanically moving the pig to a reduced section of the launcher to form a seal and thus avoiding bypassing the displacement fluid.

Other purposes and advantages of the invention will be apparent from the disclosure hereinafter.

DESCRIPTION OF THE PREFERRED EMBODIMENTS

There is a high probability that a standard foam pig cannot pass through a pipeline having substantially varying diameters without significant bypassing of displacement fluid pushing the pig. In addition, standard foam pigs are not usable as separators behind cleaning trains in view of excessive bypassing of the displacement fluid. Further, it is not practical to drive a standard foam pig through a pipeline using air as a displacement medium since the pig may hang up at obstructions in the pipeline and the air supply may be insufficient to dislodge the pig.

Figure 4:
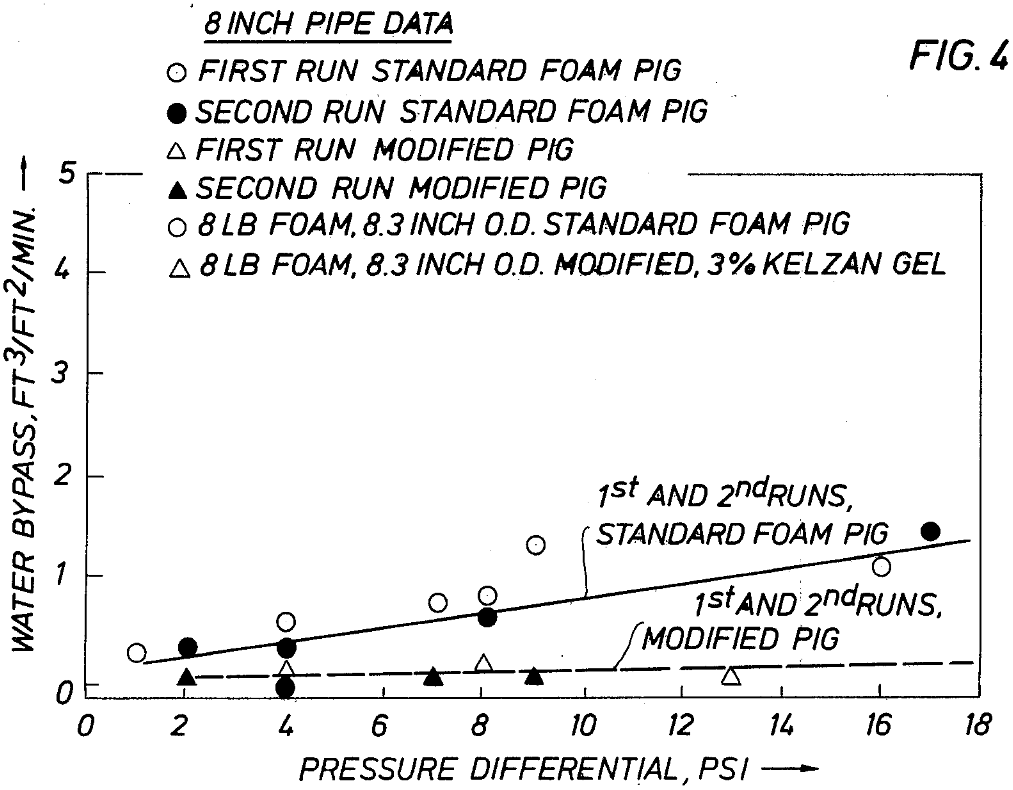
FIGS. 3 and 4 relate water bypass versus pressure differential for foam pigs.

However, in accordance with the present invention, it has been discovered that filling a foam pig with a high viscosity, high yield strength gel decreases the bypassing of both liquids and gases when these are used to drive a pig through a pipeline. Also, a gel-filled foam pig forms a good seal with the pipeline for its entire length even though pipe diameter may change substantially throughout. FIGS. 3 and 4 present test data for tests conducted to determine the amount of water bypassed at various pressure differentials across 8.3-inch O.D. pigs traversing a dual diameter pipeline constructed using 6-inch and 8-inch standard schedule 40 Grade B pipes. During the first run, the pig traveled first through the 8-inch section and then through the 6-inch section. During the second test the same pig traveled through first the 6-inch section and then the 8-inch section. Preferably, for use in pipelines 1 to 15 miles in length, such a pig has no external wrapping or coating inasmuch as these would unduly interfere with passing the pig around obstructions and the like. The density of the foam making up the pig is preferably about 8 lbs/ft$^3$, but generally, the foam must not be less than about 7 lbs/ft$^3$ or greater than about 9 lbs/ft$^3$. Preferably, the entire outer 1 to 2-inch shell of the pig should have a density of at least about 8 lbs/ft$^3$. The front of the lead portion of the pig preferably should be a truncated cone, having a slope of about 40° to 55° or most preferably about 45°, and have no plastic coating (note the embodiment of FIG. 2 discussed hereinafter). The rear end of the pig preferably should be concave and coated with a pliable, resilient coating, for example ⅛th-inch thick polyurethane.

Various gel-forming reactants known to the art may be utilized in forming the gel to fill the cell structure of the foam pigs of the present invention. Reference may be had to U.S. Pat. Nos. 4,252,465 and 4,216,026. However, it is preferred to use Kelzan-S (manufactured by Kelco, a division of Merck & Co., Inc.) gel-filled pigs since these pigs form relatively impervious deformable solid separators capable of passing through various diameter pipes and fittings while maintaining good seals. Thus, it has been found that about 3% by weight Kelzan-S gel-filled pigs expand immediately upon passing from small to larger pipe. There is no evidence that significant gel in the foam is depleted by flow induced by moderate pressure differentials across the pig.

Kelzan-S is a modified natural polysaccharide polymer produced by bacteria in a fermentation process. When Kelzan-S is added to water, a viscous fluid forms which exhibits a yield strength. At a concentration of about 3% by weight of polymer, the fluid has a viscosity of several hundred poise at low shear rates and a yield strength of several hundred dynes/cm$^2$.

It is preferred that the gel be formed in situ in the foam pigs. To accomplish this, the fine, dry polymer powder is first injected into and distributed throughout the foam pig. The pig is then filled with a fluid such as water. Within a short time, the polymer hydrolyzes and a gel is formed. The polymer powder can be injected into the foam by utilizing a sand blast nozzle equipped with an injection tube. The polymer can be distributed throughout by injecting portions into various segments of the pig. Prior to use, the pig preferably is kept in a tight fitting, moisture proof plastic wrap to protect the gel polymer if it is of a water-soluble type.

The preferred way to fill the polymer-containing pig with fluid, e.g., water, is to first subject the pig to a vacuum, maintain the vacuum while submerging the pig in the water and then release the vacuum. The vacuum (e.g., 28 to 29 inches mercury) removes the air from the pig and ruptures and removes the gas from gas-filled cells. By surface and capillary action, fluid can fill the foam. When the vacuum is released, a pressure differential of about 14 to 14.5 psi then forces fluid into the pig and fills any unfilled volume. This operation can be performed in most pig launchers currently used in the art. Upon putting the modified pig into a pig launcher, it is necessary first to remove the plastic wrap, then force into and secure the pig in the reduced section of the pig launcher, next evacuate the launcher (e.g., about 28½ inches of mercury vacuum), maintain the vacuum while filling the launcher with fluid (e.g., from 30 minutes to 1 hour), and then leave the pig in the fluid-filled launcher for quite some time (e.g., 48 hours) before use. However, a biodegradable polymer should not be left for more than 7 days.

Figure 5:
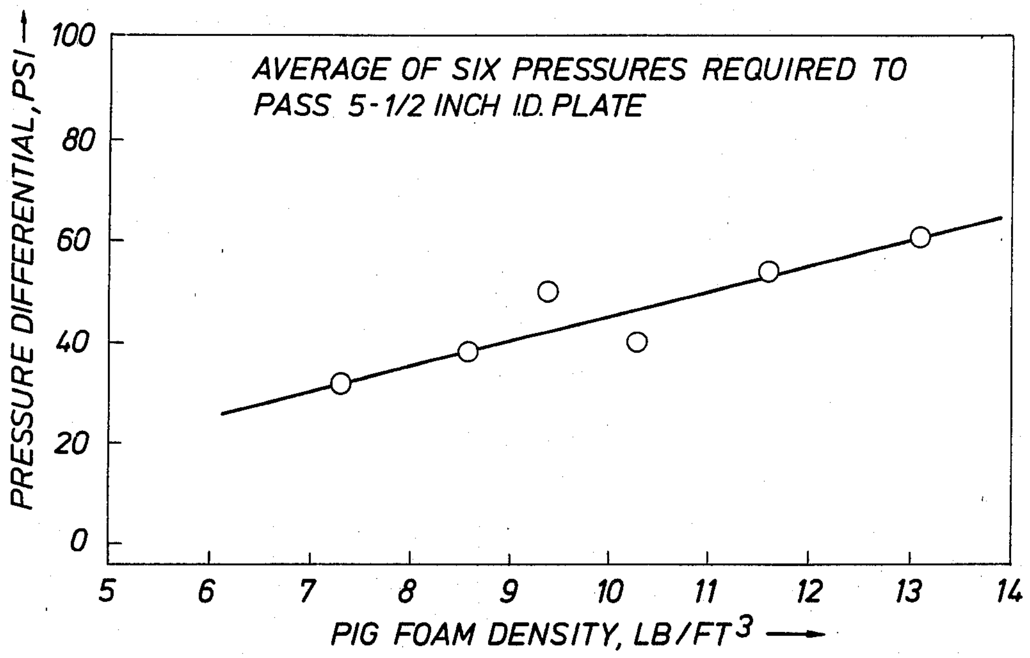
FIG. 5 relates pressure differential required to pass obstructions in a pipeline versus pig foam density.

As above noted, there appears to be an optimum density for foam pigs. If the density (stiffness) is too low, the pigs tend to wrinkle, cock and reverse while flowing through pipes. If the density (stiffness) is too high, the pigs require more pressure differentials to pass obstructions in pipes and do not seal as well as shown in FIG. 5. Thus, the foam density should be at least nearly 8 lbs/ft$^3$.

Figure 1:
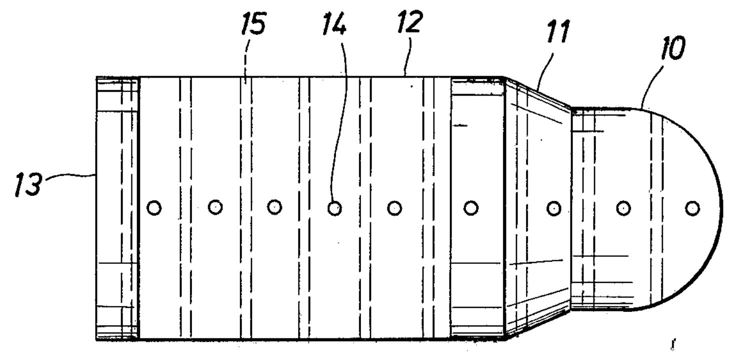
FIG. 1 discloses a gel-filled foam pig having a coated nose section and a coated rear section.

Referring to FIG. 1 of the drawings, there is shown a foam pig with a hemispherical nose 10 attached to a reduced area 11 and a main body 12. Nose 10 and the rear area 13 of the pig preferably are covered with a solid coat, for example 1/16th-inch polyurethane. Holes 14 and 15 are preferably drilled through the center of the pig throughout the length of the pig to facilitate filling the pig with gel. While the solid coat on the nose of the pig increases the durability, it may also cause sticking in the pipeline under some circumstances.

Figure 2:
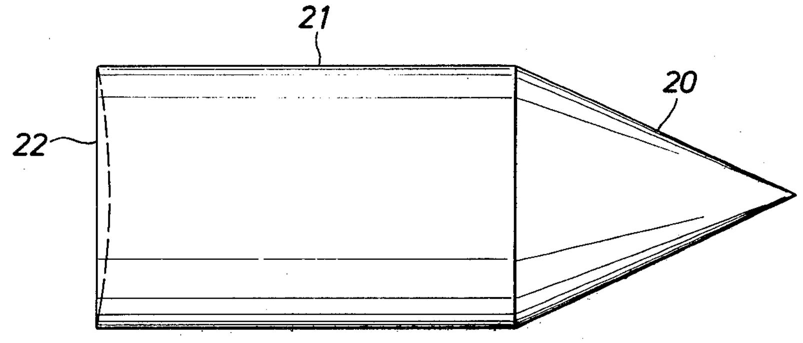
FIG. 2 discloses a gel-filled foam pig having an uncoated nose section.
Figure 3:
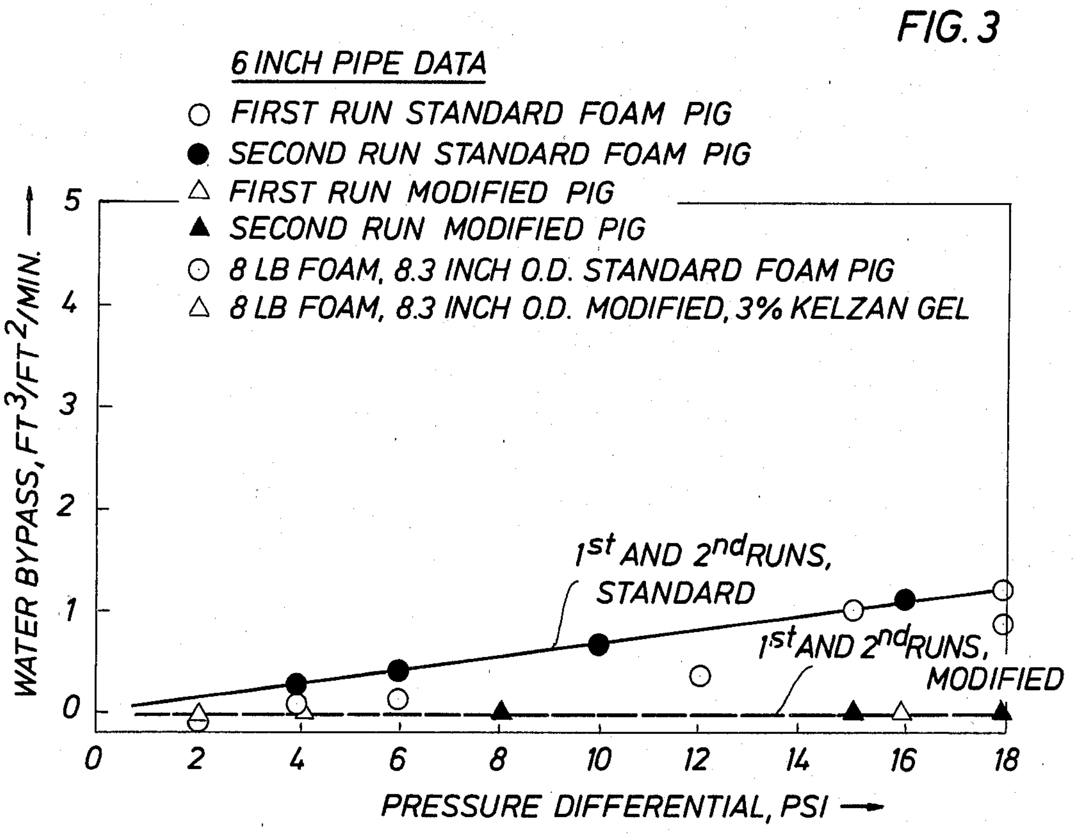

A more preferred embodiment of the invention is shown in FIG. 2 which utilizes a nose cone 20 attached to the body 21 of the pig. This pig additionally has a solid coating 22 on the rear of the pig like that of the embodiment of FIG. 1. Such a coating helps to prevent liquid bypass around the pig.

Having thus disclosed the present invention, it is apparent that other modifications and different combinations of various features of the embodiments of the invention may be made without departing from the spirit and scope of the invention as above disclosed.

What is claimed is:

1. A pipeline pig comprising a cylindrically shaped body of polymeric foam having cells filled with a gel.

2. The pig of claim 1 wherein the gel has high viscosity and high yield strength.

3. The pig of claim 2 wherein the gel is produced from a modified natural polysaccharide polymer.

4. The pig of claim 1 wherein the pig has a cone shaped nose section integral with the cylindrically shaped body.

5. The pig of claim 1 wherein the pig has a concave rear section integral with the cylindrically shaped body.

6. The pig of claim 1 wherein the rear section is coated with a relatively stiff material.

7. A process for making a pipeline pig comprising, preparing a cylindrically shaped body of polymeric foam and impregnating the cells of the foam with a gel.

8. The process of claim 7 wherein the gel is formed by injecting dry polymeric powder into the foam and then saturating the pig with liquid to form the gel.

9. The process of claim 8 wherein holes are formed in the pig to facilitate injecting the polymer.

10. The process of claim 8 wherein the pig is subjected to a vacuum to remove gas from the cells of the foam and facilitate filling the cells with liquid.

* * * * *